UNITED STATES PATENT OFFICE.

ROGER WILLIAMS, OF PROVIDENCE, RHODE ISLAND, ASSIGNOR TO NITROGEN PRODUCTS COMPANY, OF PROVIDENCE, RHODE ISLAND, A CORPORATION OF RHODE ISLAND.

PRODUCTION OF SUBSTANTIALLY PURE CARBON AND THE LIKE.

1,352,162.      Specification of Letters Patent.      Patented Sept. 7, 1920.

No. Drawing.      Application filed January 24, 1918. Serial No. 213,507.

*To all whom it may concern:*

Be it known that I, ROGER WILLIAMS, a citizen of the United States, residing at Providence, in the county of Providence and State of Rhode Island, have invented certain new and useful Improvements in the Production of Substantially Pure Carbon and the like, of which the following is a specification.

This invention relates to a process of producing pure and highly chemically reactive carbon, suitable for use in nitrogen-fixation and other processes where carbonaceous material of this description is of value.

In the patent to John E. Bucher, No. 1,120,682, dated Dec. 15, 1914, there is a disclosure of how carbon of the type in question may be produced in a mass of briquets prior to the introduction of said briquets into a zone in a retort or furnace in which free nitrogen is caused to combine with such and other carbon and with an alkali metal or other suitable element capable of acting as the base of a cyanogen compound to be formed.

As per said disclosure, carbon in very finely divided condition is deposited in said briquets by the conversion of carbon monoxid to carbon dioxid, at a temperature of preferably in the neighborhood of 500° C. to 600° C.; this reaction being favored as described in said patent, by the catalytic iron-carbon surface in the briquets. The carbon monoxid for the said conversion was produced by the cyanid forming reaction, although, as stated in effect by said Bucher, additional carbon monoxid could be supplied, obtained from a producer or a blast furnace, in which case of course, the oxygen content of the carbon monoxid is presumably obtained from atmospheric oxygen.

When this reactive carbon is thus produced, however, obviously such carbon is not available for incorporation into the mixture of catalyzer and sodium carbonate or the like, out of which, together with carbon in some suitable form, said briquets are prepared. On the other hand, but a relatively small quantity is formed in or upon the already-formed briquets and the present invention therefore aims, for one of its objects, to so produce this substance that it is directly and at once available for said mixture, or others of like or analogous nature, and at a cost of manufacture that renders its use in the chemical industries generally, available where a really pure and ash-free carbon is desired.

To begin with, I have discovered that where such a catalyst as finely divided iron is used for the conversion of carbon monoxid to carbon dioxid, it is desirable to agitate the catalytic mass, continually or from time to time, in order that comparatively clean catalytic surfaces may be presented to the gas to be treated, and in order,—further and even when this is not necessary,—to open up the catalytic mass and permit of a free gaseous movement therethrough.

Second: that the utilization of atmospheric oxygen (that is oxygen admixed with nitrogen in the relative proportions in which these gases are present in the air) as a means for combining oxygen and carbon to form carbon monoxid, is highly undesirable.

Third: that pressure aids the conversion and, hence, the consequent deposition of the valuable finely divided carbon from the gaseous mass.

In other words, I have found it to be practicable to produce this precipitated carbon entirely outside of any such mass of mixed carbon, iron and carbonate or the like; so that after production it may be incorporated in such a mixture and to any desired extent or proportion.

Preferably finely divided iron is used as the catalyst; but this is principally on the ground of cheapness, since manganese, nickel, cobalt and many other substances are available for the purpose intended; and all such substances are to be regarded as equivalents herein, as also, of course, are their oxids or the like.

A suitable air-tight receptacle is provided for the catalyzer and, preferably one moreover which is provided with means for, or is capable of, agitating the catalytic mass whenever during the course of the process it is desired to present fresh catalytic surfaces to the incoming gases, and to remove the carbon deposited on said surfaces, therefrom.

The churning around of the preferably pulverulent catalyst, as in a rotating drum, also serves the useful purpose of thoroughly stirring up the gases as they pass through such a catalytic chamber, forcing substantially all portions thereof to make contact, at one time or another, with the catalyzer.

The gas initially supplied to said chamber is preferably substantially or nearly pure carbon monoxid, in contradistinction to, for example, producer gas, which by volume is apt to be approximately but one third carbon monoxid at most. As a result of this non-dilution of the gas to be converted, not only do the molecules of carbon-monoxid have at least three times as much opportunity to contact with the catalyzer, which hence permits of a much smaller apparatus per unit of volume yield of the desired carbon; but furthermore the percentage of conversion to carbon dioxid which is possible at any given temperature is very materially affected by the presence or absence of a diluent gas in the apparatus.

Thus, at a given temperature approximating 650° C., in the presence of an efficient catalyzer, the maximum percentage of carbon dioxid in a gaseous mixture of said dioxid and carbon monoxid alone, may be, let us assume 40%; whereas if a mixture of two volumes of nitrogen to one of carbon monoxid, be introduced into the catalytic chamber, at said temperature, the percentage of carbon dioxid which can form from said monoxid will drop to but a little over 20%; there being then present approximately 6% carbon dioxid, 23% carbon monoxid and 71% nitrogen. In other words, in the absence of the diluent nitrogen the maximum possible ratio of the dioxid to monoxid at the assumed temperature is 40/60 or 0.67; whereas with the nitrogen present, the ratio is 6/23, or 0.26. The supply of carbon monoxid should preferably, hence, be reasonably pure and free from nitrogen.

To economically obtain such a substantially nitrogen-free gas, I prefer to use initially, practically pure oxygen, of which but a relatively small quantity need be supplied. This is directed into a suitable retort, capable of withstanding a temperature of 1000° C. or more; said retort preferably being made of alundum or other material which will not readily oxidize at such temperatures. This retort is preferably filled with fragments of low grade coke or the like, and therein the pure oxygen is promptly converted to carbon monoxid, very little carbon dioxid (5% or less) being present in the gaseous product.

Before the hot gas is permitted to enter the catalytic chamber or drum, it is cooled down usually below 600° C. and preferably to about 500° C., so that when it encounters the finely divided iron or the like, carbon dioxid is at once copiously formed.

The carbon precipitated upon the catalyzer is shaken around therewith and this converting operation is continued until for example an equal quantity, by volume, of said finely divided carbon and iron exists. Of course, the operation may be further continued; but as the carbon greatly increases in amount, the percentage of conversion of the later incoming gas is reduced.

If desired, an exceedingly intimate mixture of carbon and iron may thus be produced, in proportions available for the formation,—after sodium carbonate or the like has been added,—of briquets for use in the said Bucher process.

Where it is desired to obtain the carbon by itself, the drum may be emptied, after the flow of gas has been stopped,—or the delivery of product mixed with iron, for example, as well as the delivery of the iron after separation from the product, to said drum, may be continuous,—and the separation of the iron from the precipitated carbon effected in any desired manner, e. g. magnetically, electrostatically, or more simply by means of an air blast:—various modes of and apparatus for separating heavy pulverulent, and especially magnetic, material, from light, non-magnetic material, being well known and in common use.

The carbon dioxid formed during the deposition of the carbon is, of course, preferably collected and either led back to the retort or to a similar one, heated to about 1000° C., and as it passes through the highly heated coke, carbon is taken up, the carbon dioxid being reversely converted to carbon monoxid. Here again the absence of any diluent gas, such as nitrogen, is of advantage, and of course no additional oxygen need be supplied, other than to make up for possible mechanical losses, such as by leakage.

The process is hence cyclic, and provides means for abstracting carbon from carbonaceous matter such as coke of more or less inferior quality and having a high ash-content,—carrying this carbon over in combination with another element, oxygen, to a point where, preferably by catalytic action, it is deposited out in ash-free and peculiarly reactive condition; the so deposited material, further, being separable from the catalyst without the necessity for further chemical treatment; namely, by mechanical or magnetic means, or the like.

Practically the only loss is one of heat, and that is comparatively an inexpensive one; and in the absence of nitrogen in the gaseous current, as above described,—this loss is much reduced as compared to when considerable nitrogen is present. Further, even much of the heat loss may be prevented by suitably using the waste heat for making steam or the like, or by causing the gas issuing from the high temperature retort to impart much of its heat to the gas issuing from the 500° retort, through the intermediacy of any of the well known types of heat interchangers; this procedure of course being preferred.

If desired, the process may be made even more effective by operating under pressure in the catalytic chamber; since the conversion of the monoxid to the dioxid is favored by pressure; two gaseous molecules of carbon monoxid on one side of the equation being replaced by one of carbon dioxid on the other as follows:

$$2CO \rightleftharpoons CO_2 + C$$

Now, while pressure favors the formation of the dioxid, it, of course, opposes the reverse action; but, on the other hand, on account of the high temperature in the highly heated retort, this factor is practically negligible as compared with the loss of energy and other trouble involved in letting down the pressure of gases entering the retort and raising them again before delivery to the catalytic chamber or drum.

When pressure is employed, therefore, as it may be to advantage, I prefer to maintain it substantially constant through the cycle.

In conclusion, I may add that in conducting the process, the catalyst need not be in metallic form, at least initially, but may be a compound thereof, such, for example, as an oxid; since the carbon monoxid in such case will of course tend to reduce said oxid. Thus:

$$FeO + CO \rightleftharpoons Fe + CO_2$$

Also, while iron is the preferred catalyzer, on account of its cheapness, I desire not to be limited thereto in any way, since various other substances are efficient catalyzers for the preferred and many analogous reactions. Thus nickel and cobalt, for example, are even more efficient catalyzers than iron, although by no means so inexpensive; and even carbon itself is capable of acting catalytically, especially when admixed or associated with some other catalyst, such as iron. I make no claim to carbon specifically, as a catalyst, however, any more than to iron; the capacity of a catalytic iron-carbon surface to effect the desired conversion of carbon monoxid to carbon dioxid with deposition of carbon, at suitable temperatures, having been discussed in the patent to John E. Bucher, above referred to.

In conclusion I may state that while, as aforesaid, the herein described cyclic process may be initially started by using pure oxygen as the source of the limited amount of oxygen referred to in certain of the claims as being involved in the cycle of operations,—since the process at the end of the first cycle really starts with carbon dioxid or the latter mixed with carbon monoxid; and since, further, substantially pure carbon dioxid, or carbon dioxid mixed with carbon monoxid, or even carbon monoxid alone, can be initially used in lieu of pure oxygen, I desire in no way to be limited as to the source of oxygen for the process, except in certain of the claims when such limitation is specifically indicated.

Having thus described my invention, what I claim is:

1. The process of producing ashless carbon which comprises operating in a continuous closed system from which air is substantially excluded, to react upon carbonaceous material with oxygen bearing material to form a gaseous product having a carbon monoxid content materially in excess of thirty-three per cent. of said product, cooling said product and catalytically converting a considerable part thereof to carbon dioxid while preciptating carbon therefrom.

2. The cyclic process of obtaining substantially pure carbon from carbonaceous material which comprises operating with a limited amount of oxygen in a substantially closed system so as to alternately abstract carbon from carbonaceous material with formation of carbon monoxid and then part with said carbon by the conversion of said carbon monoxid to carbon dioxid at a temperature which favors the conversion of considerable of said carbon monoxid to carbon dioxid, to thus, in effect, cause said oxygen to carry carbon from one part of said system to another.

3. The cyclic process of obtaining substantially pure carbon from carbonaceous material which comprises operating with a limited amount of oxygen in a substantially closed system so as to alternately abstract carbon from carbonaceous material, with formation of carbon monoxid in a part of said system at a temperature approximating 1000° C., and then converting said carbon monoxid to carbon dioxid with deposition of carbon in another part of said system, at a temperature approximating 600° C.

4. The process of obtaining substantially pure carbon from carbonaceous material, which comprises operating cyclically with a limited amount of an element, the atomic combinations of which with carbon may be varied by changes in temperature, so as to abstract carbon from said carbonaceous material at a temperature which favors the formation of a gas which comprises said abstracted carbon in combination with said element, and then, in part at least by materially lowering said temperature, reacting upon said gas to precipitate carbon therefrom while forming a second gas the residual carbon in which is still combined with said element, and utilizing said second gas in the continuance of the cyclic operation.

5. The process of obtaining substantially pure carbon from carbonaceous material which comprises treating said material to produce, while highly heated, carbon monoxid gas from some of the carbon thereof, separating said gas from the residue of said material and converting a portion thereof to carbon dioxid while under a pressure in excess of that of the atmosphere in part at least by materially lowering the temperature of said carbon monoxid, substantially pure carbon being precipitated during said conversion.

6. The process of producing pure carbon which comprises subjecting carbon monoxid gas to pressure in excess of that of the atmosphere, converting said gas, while under said pressure, to carbon dioxid, through the instrumentality of finely divided catalytic material, said pure carbon being deposited upon said material during said conversion, agitating said material to favor the continuance of said conversion, and re-converting said carbon dioxid to carbon monoxid by supplying carbon thereto at a temperature above that at which said first mentioned conversion was effected.

7. The process of obtaining substantially pure carbon from carbonaceous material, which comprises operating cyclically with an element, the atomic combinations of which with carbon may be varied by changes in temperature, so as to abstract carbon from said carbonaceous material at a temperature which favors the formation of a gas which comprises said abstracted carbon in combination with said element, then, by temperature reduction aided by a catalyst, reacting upon said gas to precipitate carbon therefrom upon said catalyst, and completing the cycle by utilizing the gaseous residues from the step last aforesaid for the further abstraction of carbon from carbonaceous material.

8. The process of producing ashless carbon which comprises subjecting carbonaceous material to heat and converting a portion thereof to carbon monoxid, separating the latter from said material, cooling said carbon monoxid and converting it to carbon dioxid, in part at least through the instrumentality of a catalyst, and agitating said catalyst to favor the conversion last aforesaid.

9. The process of producing ashless carbon which comprises converting carbon monoxid to carbon dioxid while causing a precipitation of substantially pure carbon therefrom at a temperature below 700° C., in part at least by means of a mass of catalytic material, and agitating said mass to favor said conversion.

10. The process of producing ashless carbon which comprises converting carbon monoxid at a relatively low temperature to carbon dioxid while causing a precipitation of substantially pure carbon therefrom, converting said carbon dioxid to carbon monoxid by reacting carbonaceous material therewith at a higher temperature, and conserving heat by causing the hot reaction gases, resulting from the last mentioned conversion, to preheat the gaseous products of the first mentioned conversion.

11. The process of producing ashless carbon, which comprises reacting upon carbonaceous material with oxygen containing material to form carbon monoxid at a relatively high temperature, effecting an interchange of heat between the so formed hot carbon monoxid and a current of relatively cool gaseous material having a high content of carbon dioxid, and forming said carbon dioxid by passing said carbon monoxid over catalytic material and at a temperature favoring the conversion of carbon monoxid to carbon dioxid with an attendant deposition of carbon.

In testimony whereof I have affixed my signature in the presence of two witnesses.

ROGER WILLIAMS.

Witnesses:
PERRY A. DIXON,
J. M. ARCHER.